C. F. KETTERING.
ELECTRICAL STORAGE SYSTEM.
APPLICATION FILED MAY 22, 1911. RENEWED JAN. 23, 1917.
1,284,707.
Patented Nov. 12, 1918.
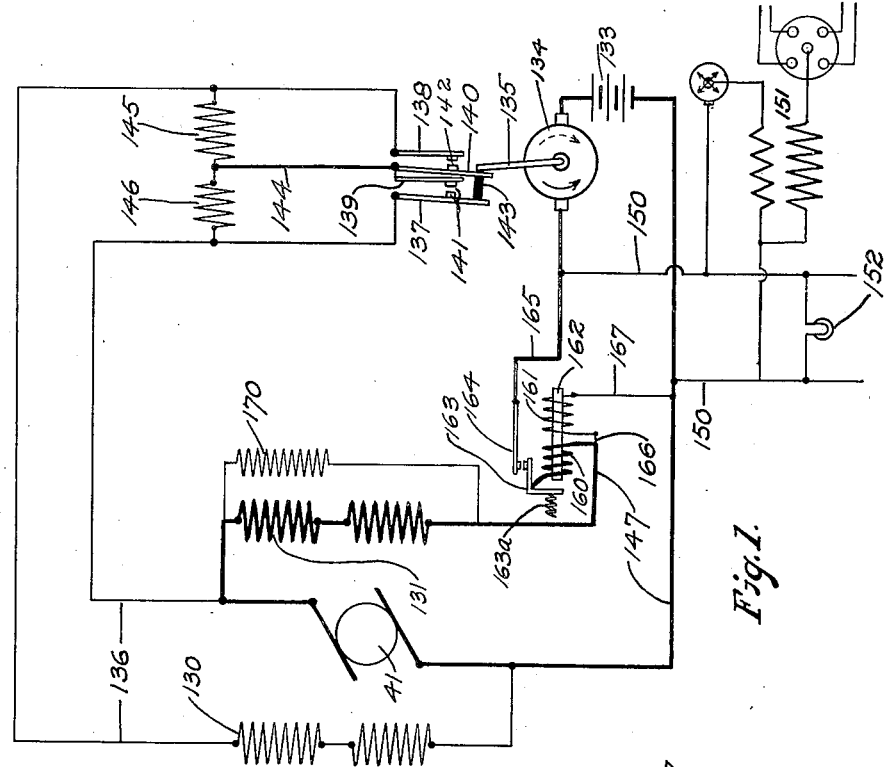

UNITED STATES PATENT OFFICE.

CHARLES F. KETTERING, OF DAYTON, OHIO, ASSIGNOR TO THE DAYTON ENGINEERING LABORATORIES CO., A CORPORATION OF OHIO.

ELECTRICAL STORAGE SYSTEM.

1,284,707.

Specification of Letters Patent.

Patented Nov. 12, 1918.

Original application filed April 17, 1911, Serial No. 621,512. Divided and this application filed May 22, 1911, Serial No. 628,813. Renewed January 23, 1917. Serial No. 144,055.

*To all whom it may concern:*

Be it known that I, CHARLES F. KETTERING, residing at Dayton, Montgomery county, Ohio, have invented certain new and useful Improvements in Electrical Storage Systems, of which the following is a full, clear, and exact description.

This invention relates to an electrical storage system, and more particularly a controlling apparatus for regulating and controlling the storage of electrical current in storage batteries or other electrical accumulators.

It is among the objects of this invention to provide means controlled by the amount of current stored in the accumulator for varying the electrical output of the generator, and this is accomplished by means of an electric meter which controls the saturation of the batteries by means of governing the field of the generator which is doing the charging. This is brought about by having this electric meter cut resistance into the shunt field of the generator so as thereby to weaken the generator current.

Further objects and advantages of the present invention will appear from the accompanying drawing wherein:

Figure 1 is a diagrammatic view of the various elements and their electrical connections which comprise one embodiment of the preferred form of the present invention.

Fig. 2 is a vertical sectional view on the line 2—2 of Fig. 3.

Fig. 3 is a top plan view of the ampere-hour meter employed in the present invention, a section of the cover or casing being broken away to show the arrangement of the contact strips associated with the shunt circuit and field.

The present invention is a division of my co-pending application which issued into Patent No. 1171055, dated February 8, 1916, and embodies as will be presently described in detail, a differentially wound generator electrically connected with a suitable accumulator in combination with means controlling the output of the generator in accordance with the amount of charge contained in the accumulator; and further means for controlling the rate of charge at which the accumulator is charged by the generator.

Referring to the drawings wherein like reference characters indicate like parts throughout the different views, and particularly to the diagrammatical showing in Fig. 1, the generator 41, is shown as having its field wound with differential windings. That is, there are the shunt field coils 130 and series field coils 131, said coils being wound differentially, that is, wound oppositely so as to oppose each other in magnetic effect when used together for exciting the field. The storage battery or accumulator is shown at 133, and is adapted to furnish current for lighting, ignition and other purposes, and, as described in detail in my said patent, the current from the accumulator may be fed back into the generator, whereby the said generator will be driven as motor to accomplish any desired result, such for example, as starting or cranking a gas engine. This operation of the invention however has been sufficiently described and claimed in my above mentioned patent and inasmuch as the present invention comprises particularly a system of control for the generator and accumulator no further description of this operation will be given.

When the prime mover or motor-generator 41 is charging the accumulator 133 both the shunt field coils 130 and the series field coils 131 are used.

Under this arrangement it is desirable to have some device for controlling the extent of charging of the batteries so that they will not be charged above a predetermined point beyond point of saturation. This is accomplished in the present instance by means of an electric meter or battery current measuring device placed in series in the charging circuit and controlling certain resistance in the shunt field circuit of the generator. This electric meter 134 is operated by the flow of current through it to revolve contact pointer 135. The control of this contact pointer relative to the resistance device just referred to is procured in the following manner: The lead wires 136 extend from the generator and from the shunt windings 130 to contact strips 137 and 138. Located between these two strips are two other strips 139 and 140. Normally the contact strips 137 and 139 make contact at their outer extremities through contact points 141, and similarly the contact strips 138 and 140 normally make contact through the points 142. At the outer end of the contact strip 140 is a pin 143 arranged to strike the contact strip 137 when the strip 140 is moved to the left in Fig. 1, thus separating or breaking the connection between strips 137 and 139. Contact strips 139 and 140 are connected together at their inner ends as shown, and a wire 144 extends therefrom to a point intermediate the two resistance coils 145 and 146 which are bridged across between the lead wires 136 of the shunt circuit, as shown.

The operation of this device is as follows: When the generator is being operated to charge the batteries the flow of current through the shunt circuit will be as follows: From the generator through wires 136 and contact strips 137, 139, 140 and 138 thereby short circuiting the resistance coils 145 and 146. As the charge within the battery increases the pointer 135 of the meter will move in the direction shown by the full line arrow in Fig. 1 and upon the battery being charged to the point of saturation or to a predetermined point beyond saturation as explained hereinafter, the said pointer will contact with the strip 140 and upon continued movement will separate the same from strip 138. This separation of the contact strips 138 and 140 opens the main line of the shunt circuit and causes the current to flow through the strips 137 and 139 through the wire 144 and then through the resistance coil 145.

The result is that this resistance thereby introduced into the shunt field circuit weakens the current therein and this weakens the current flowing through the main lead wires 147 thereby weakening the current delivered to the storage battery or the accumulator 133. Under certain conditions the introduction of the single resistance coil 145 will not be sufficient to weaken the charging current to the proper degree and for this reason the contact strips of the shunt circuit have been arranged so that upon the continued movement of the pointer 135 in the same direction after the strips 138 and 140 have been separated the lug or projection 143 carried by the strip 140 will engage with and separate the strip 137 from contact strip 139. This obviously throws the other resistance coil 146 into circuit in the shunt field, thereby materially increasing the resistance. This still further reduces the strength of said shunt field and likewise reduces the main current delivered to the storage batteries.

While only two of these resistance coils and their controlling contact strips have been shown in the present embodiment it will be obvious that sufficient resistance may be introduced either by increasing the number of resistance coils and rearranging the contact strips accordingly or by making the two resistance coils of sufficiently high resistance to reduce the charging current of the generator to a negligible quantity at such times as the accumulator has attained the point of saturation.

From the main lines 147 extend lead wires 150 which are used for tapping off of this storage battery circuit the necessary current for the ignition apparatus shown diagrammatically at 151 and the lighting devices shown diagrammatically at 152.

Thus assuming that the batteries have been charged to the point of saturation and the charging current reduced to a minimum in the manner described, then if the ignition and lighting systems are put into operation, tapped off of this battery circuit, a substantial amount of current will of course be drawn from the circuit or accumulator, thus causing the electric meter to travel in the reverse direction as indicated by the dotted arrow in Fig. 1, and thereby retracting the pointer 135 from contact with the strip 140. Inasmuch as the strips 137 and 140 are preferably of spring material they will normally assume the straight position shown in Fig. 3 as soon as the pointer 135 retracts from contact strip 140 thus closing the main line of the shunt circuit whereby the resistance coils 145 and 146 will be short circuited and thus permit the shunt field to have its maximum effect. Then the charging operation may go on as previously explained.

Now the reducing of the charging current to a minimum when the batteries have reached the point of saturation may be sufficient, but it may be also desired to break this charging current altogether at such point; and for that reason I have introduced an automatic cutout as shown in Fig. 1. This cutout comprises two coils 160 and 161 the former being a low resistance coil and the latter a high resistance coil, wound upon a core 162. A right angled armature 163 is connected to the coil 160 and when attracted by the core 162 makes contact with the overlying strip 164 which is connected by wire 165 with the main line of the circuit connecting the generator and storage batteries. Both coils 160 and 161 are connected at the point 166 with the upper wire 147, and the other end of the coil 161 is connected by the wire 167 with the lower wire 147.

In the position of the parts of this cutout shown in Fig. 1, the storage batteries are normally disconnected from the circuit coming from the generator since the armature 163 and contact strip 164 are separated. Thus when the generator starts to turn for beginning the operation of charging, the current through the series field windings and wires 147 first has to build up through the high resistance coil 161 so as to attract the armature 163 to the core 162 and thus close the circuit through the strip 164 and thereby put the storage batteries into the main charging circuit. This movement of the armature 163 enables the main current to pass through the low resistance coil 160 to the storage batteries, thereby maintaining the contact closed against the strip 164.

It will now be seen that the cutout apparatus prevents current from the storage battery discharging back through the generator in case the generator should slow up so as to reduce its current by slackening of speed. That is, kick-back of the current of the storage battery running through coil 160 reversely would break the circuit connection between armature 163 and the strip 164. The spring 163$^a$ restores the armature 163 to the position of Fig. 1. This cuts the storage battery out of the generator circuit and leaves the generator circuit running through the high resistance coil 161, wherein the current is now too weak, on account of the slow speed of the generator to energize the core to attract armature 163 and thus restore the contact with the strip 164.

This is a well known operation of electrical cutout but I have made use of this cutout in this position not only to operate as the cutout in the manner just explained but also, if it be desired, to cut off the storage battery connection completely when the point of saturation of the batteries is reached.

That is, when the electric meter pointer 135 has moved to such position as to indicate the desired saturation of the batteries as shown in the Fig. 1, thereby throwing the resistance coils 146 and 145 into the shunt field circuit as already explained, this weakens the shunt field and minimizes the charging current coming from the generator, to such an extent that it is similar in effect to the slowing up of the generator in speed. That is, the batteries kick-back or overcome the charging current and thereby operate the cutout to cut the batteries out of circuit altogether. Thus it will be seen that the operation of the electric meter is first to weaken the charging current at the point of saturation of the batteries and then, if desired, to break the charging circuit altogether by means of this cutout, which is the same cutout which operates in this manner to effect the breaking of this charging circuit when the charging current begins to weaken for any other reason, such as slowing up or stopping of the generator.

It will be seen from this particular arrangement of the differential winding of the generator, that when the generator first starts to operate, the field is built up in the shunt windings and the current gradually begins to rise in the main line and also in the series windings. The series windings being opposed in effect to the shunt windings this rise of the current therefore has the effect of gradually bringing the two fields into the point of balance so far as concerns their combined effect on the field. Therefore the charging current rises rapidly at first and then reaches the point where the increase in speed of the generator produces but very little increase in the charging current. This is particularly advantageous in an apparatus of this sort designed for charging purposes where the generator may have variable speeds within wide limits and sometimes reaches excessively high speeds. In such event the current simply soon rises to its maximum and then rises beyond that only very slowly. The relationship between the shunt and series winding respectively is of course suitably arranged as to the number of turns to effect the reaching of the maximum current at the desired point.

It may be desired however to reach this maximum charging current more quickly, that is, to reach it for lower speed of the generator so that the generator will be charging the batteries over a longer period of time in the ordinary varied operation of the device. To accomplish this I provide an iron wire by-pass or short circuit resistance 170 shown in Fig. 1. This resistance may be of any suitable nature which is variable with the condition of the current flowing therethrough. Iron wire has the property of increasing its resistance when heated up under the influence of increasing current flowing through it. Thus it will be seen that with this arrangement, the iron wire when cold at the outset, forms a short circuit around the series field. Therefore the opposing effect of this field is *nil* in the early speeding up of the generator. Therefore the current, under the excitation of the shunt field, rises very rapidly to a maximum and sends the charging current through the iron wire resistance 170. The rising of the current therein however heats up the wire which increases the resistance and thus begins to send the current through the series winding 131, which then causes the opposing effect in the field to take place as previously explained. This arrangement of the iron wire resistance forms in itself the subject matter of a separate application, Serial Number 45106, filed August 12, 1915, being more broadly claimed therein.

It is thus apparent from the foregoing that the effect of this iron wire resistance is to disable the regulating effect of the opposing series field for the low speeds of driving, but as soon as the speed rises to the desired point, and the current reaches a determined point, the inherent characteristics of the iron wire are such that this disabling effect is in itself automatically rendered ineffective. In this way, the iron wire at the early stages of low speed, constitutes the generator as a plain shunt wound generator, or at least it has the characteristics of such a shunt wound machine, whereas, as soon as the current gradually rises toward its maximum, this regulating action of the opposing series field is now automatically thrown into operation, just as in low speeds it was automatically thrown out of operation.

Furthermore, it will be observed that the electric meter control over the shunt field, affords a still further control over the current regulation. That is, the cutting in of resistance into the shunt field circuit by the meter, weakens the effect of the shunt field, and therefore by comparison, augments the opposing effect of the series field, so that a still further regulating effect is thus produced to taper off the charging current going into the batteries.

Thus the iron wire device has its regulating effect by short-circuiting the series field and allowing the current to rise rapidly for low speed; then the iron wire becomes heated up, whereby automatically to throw in the regulating effect of the opposed series field against the shunt field; and finally the electric meter weakens this shunt field so as to get a still further effect in the way of balancing the two fields, upon the approach to the point of saturation.

In Figs. 2 and 3 are shown the details of mechanical construction of electric meter 134 referred to. This meter is of the well known Sangamo type forming the subject matter of various patents to Robert C. Lanphier and Ludwig Gutmann. The meter comprises a revoluble disk 180 which revolves in a mercury bath contained in a chamber 181 into which electrodes 182 project. These electrodes are connected to the lead wires 147 which connect the meter in series with the generator and the storage batteries. The revolving spindle 183 which is geared up by pinions and gear wheels 184 to rotate the aforesaid contact pointer 135. This contact pointer has a lug 185 or other suitable projection (see Fig. 2) extending into the path of the aforesaid contact strip 140 as previously explained or the pointer itself may directly strike this contact strip.

While I have shown one preferred embodiment of one form of my invention, it will be understood that various changes and alterations of the elements, and combination of elements, therein, may be made without departing from the spirit and scope of the invention.

What I claim is as follows:

1. In a system for storing electrical energy, the combination with a generator, having a field winding circuit, a series of resistance elements adapted to be cut successively in and out of said field winding circuit, and a contact device for each resistance element; of an accumulator; electrical connections between the generator and the accumulator; and an electric meter also electrically connected with said generator and said accumulator, said meter including a mechanical member thereof which is adapted to operate directly and successively upon said contact devices to thereby throw in and out of the field circuit said resistances whereby to produce successive reductions in the current output of the generator.

2. In a system for storing electrical energy, the combination with a generator having a field winding circuit, a series of resistance elements adapted to be cut successively in and out of said field winding circuit, and a contact device for each resistance element; of an accumulator; electrical connections between the generator and the accumulator; an electric meter also electrically connected with said generator and said accumulator, said meter including a mechanical member thereof which is adapted to operate directly and successively upon said contact devices to thereby throw in and out of the field circuit said resistances; and a cutout device for finally breaking the circuit between the generator and the accumulator.

3. In a system for storing electrical energy, the combination with an accumulator, of an electric generator comprising a shunt field winding and circuit; a plurality of resistance elements bridging said circuit; contact strips normally closing said circuit and having electrical connection with said separate resistance elements; of a main circuit having a measuring device in series in said main circuit and operable upon said contact strips to successively cut the said resistance elements into the shunt field circuit, whereby the current in the shunt field will be successively weakened, and the amount of current passing into the accumulator successively reduced.

4. In a system for storing electrical energy, the combination with a generator including a shunt field circuit, of an accumulator electrically connected therewith; a measuring device included in the electrical connection; and a series of resistances having contact devices directly controlled by a movable member of the said measuring device, and adapted to be cut into or out of the shunt circuit of the generator.

5. In a system for storing electrical energy, the combination with an accumulator, of a generator comprising differentially wound shunt and series field windings; a main circuit connecting the accumulator and the generator, and including said series field winding; a battery current meter associated with said circuit; a shunt circuit including the shunt field winding; a series of resistance elements associated with the shunt circuit; contact elements for each of said resistance elements included in said shunt circuit; and a controlling member mechanically connected with the movable parts of said meter and operating directly upon said contact elements to successively cut said resistance elements into and out of the shunt circuit, whereby the amount of current passing from the generator to the accumulator will be limited.

6. In an electrical storage system, the combination with an accumulator, of a generator comprising differential shunt and series field windings; a resistance associated with the shunt field winding; a main circuit including the series field winding and electrically connecting the accumulator and the generator; a battery current meter in said main circuit, operable to control said resistance associated with the shunt field; a cut-out device in said main circuit, comprising high resistance and low resistance coils; and an iron wire by-pass in parallel with said series field winding between the generator and the cut-out device, said iron wire being initially in series with the high resistance coil of the cut-out, whereas when said cut-out is closed, said iron wire is in series with the low resistance coil and in series with the other elements of said main circuit.

7. In an electrical storage system, the combination with a generator having oppositely wound series and shunt field windings, of an accumulator; a main circuit connecting the generator and the accumulator; an automatically variable resistance for coöperating with said series field winding to automatically disable the opposing effect of said series winding and also automatically enable said effect according to variations in the flow of current from the generator; an electric meter in the main circuit between the generator and the accumulator; resistance elements included in the circuit of the shunt field winding; and means connected with said electric meter for throwing said resistance elements in and out of said shunt field circuit.

8. A system of electrical distribution, comprising a generator, a storage battery, translating devices, means for measuring the current supplied to said battery from said generator, and the current supplied by said battery to the translating devices; and means controlled by said measuring means for automatically reducing the voltage of the generator when the battery has been charged to a predetermined extent and for increasing the voltage of the generator, when the battery has been discharged to a predetermined extent.

9. In combination, a source of E. M. F., a storage battery charged thereby, means for measuring the charge delivered to said battery adapted to cause said source to deliver a reduced output when a predetermined battery charge has been measured.

10. In an electric system, a generator, a storage battery to be charged thereby, means for reducing the generator output when the battery is fully charged, and means in series with the battery for determining the point at which said output reducing means shall reduce the generator output.

11. In an electrical system of distribution, a generator provided with an exciting field permanently connected in circuit, a storage battery to be charged thereby, means for measuring the output to said battery, and means under control of said measuring means for increasing the resistance of said exciting circuit when a predetermined charge has been measured, said means also operating automatically to reduce said resistance upon predetermined battery discharge.

12. In an electrical system, in combination, a storage battery, a source of supply controlled to charge said storage battery, means influenced by the product of time and value of current delivered to said battery and coöperating with said source to cause said source to deliver a reduced current after a predetermined quantity has been supplied to said battery.

13. In an electrical system of distribution, a generator provided with an exciting field permanently connected in circuit, a storage battery to be charged thereby, an automatic switch between said generator and battery, means for measuring the input to said battery, and means under the control of said measuring means for reducing the generator excitation to thereby cause the opening of said automatic switch said means coöperating to automatically restore the full generator excitation upon predetermined battery discharge.

14. In an electrical system of distribution, a variable speed generator provided with a shunt field circuit, said circuit including a normally short circuited resistance, a storage battery to be charged by said generator, an ampere hour meter for measuring the battery input, and means responsive to said ampere hour meter for opening the short circuit around said resistance when a predetermined battery input has been measured and automatically causing the restoration of said short circuit upon predetermined battery discharge.

15. In an electrical system of distribution, a variable speed generator provided with a shunt field circuit, said circuit including a normally short circuited resistance, a storage battery to be charged by said generator, an automatic switch adapted to disconnect said battery from said generator when the generator voltage falls below that of said battery, a meter for measuring battery input, and means responsive to said meter for opening the short circuit around said resistance when a predetermined battery input has been measured to reduce the excitation of said generator, whereby the E. M. F.

developed by said generator is reduced to an appreciable lower voltage and said switch is caused to open, said means automatically operating to restore said short circuit upon predetermined battery discharge.

16. In an electrical system, a source of current comprising a generator having inherently controlled output, a battery charged thereby, means for integrating the charging current, and means controlled by said integrating means for causing said source to deliver current to the system at a reduced rate when a predetermined amount of charge has been delivered to said battery.

In testimony whereof I affix my signature in the presence of two subscribing witnesses.

CHARLES F. KETTERING.

Witnesses:
J. B. HAYWARD,
CHAS. D. BRONSON.